(12) United States Patent
Milousheff

(10) Patent No.: US 8,667,027 B2
(45) Date of Patent: Mar. 4, 2014

(54) DIRECTED GRAPH TRANSITIVE CLOSURE

(75) Inventor: Zack Milousheff, Boxford, MA (US)

(73) Assignee: BMC Software, Inc., Houston, TX (US)

( * ) Notice: Subject to any disclaimer, the term of this patent is extended or adjusted under 35 U.S.C. 154(b) by 171 days.

(21) Appl. No.: 13/074,983

(22) Filed: Mar. 29, 2011

(65) Prior Publication Data

US 2012/0254254 A1 Oct. 4, 2012

(51) Int. Cl.
*G06F 17/00* (2006.01)

(52) U.S. Cl.
USPC .......................................... 707/802

(58) Field of Classification Search
CPC .................. G06F 17/30994; Y10S 707/99944
See application file for complete search history.

(56) References Cited

U.S. PATENT DOCUMENTS

| 6,654,753 | B1 | 11/2003 | Arda et al. | |
|---|---|---|---|---|
| 7,680,951 | B1 * | 3/2010 | Kulik | 709/238 |
| 2002/0099684 | A1 * | 7/2002 | Ardoin et al. | 707/1 |
| 2005/0010606 | A1 * | 1/2005 | Kaiser et al. | 707/200 |
| 2006/0168565 | A1 * | 7/2006 | Gamma et al. | 717/122 |

* cited by examiner

*Primary Examiner* — Yuk Ting Choi

(57) ABSTRACT

Disclosed are methods and systems to provide for using database triggers to maintain a relational persistence of the transitive closure and path structure of an object hierarchy in the form of an object hierarchy bridge table. In one embodiment, database triggers fire when objects or relationships are added or deleted from the hierarchy. Based on the additions and deletions, a delta can be calculated and applied to an object hierarchy bridge table and the graph transitive closure and path structure can be dynamically built and maintained as corresponding changes to the graph occur. Later, more efficient access and retrieval of a graph transitive closure and path structure can be retrieved without necessarily having to perform recursion to calculate the graph transitive closure and path at request time.

25 Claims, 6 Drawing Sheets

```
HRB_CLASS(
HRB_ID,
ANCESTOR_ID,
ANCESTOR_VERSION_ID,
DESCENDANT_ID,
DESCENDANT_VERSION_ID,
DISTANCE,
START_DATETIME,
END_DATETIME,
KEY (HRB_ID)
)
```

FIGURE 2A

```
HRB_CLASS_PATH (
HRB_ID,
SEQUENCE_ID,
BL_ASSET_CLASS_ID,
BL_ASSET_VERSION_ID,
KEY (HRB_ID,SEQUENCE_ID)
)
```

FIGURE 2B

HRB_CLASS TABLE

300

| HRB_ID | Ancestor | Descendant | Distance |
|---|---|---|---|
| 1 | VC | VC | 0 |
| 2 | Hosts | Hosts | 0 |
| 3 | Server | Server | 0 |
| 4 | Dir | Dir | 0 |
| 5 | DC | DC | 0 |
| 6 | VC | Hosts | 1 |
| 7 | VC | Server | 2 |
| 8 | VC | Dir | 3 |
| 9 | VC | DC | 1 |
| 10 | VC | Server | 2 |
| 11 | VC | Dir | 3 |
| 12 | Hosts | Server | 1 |
| 13 | Hosts | Dir | 2 |
| 14 | DC | Server | 1 |
| 15 | DC | Dir | 2 |
| 16 | Server | Dir | 1 |
| 17 | Dir | Dir | 1 |

FIGURE 3

HRB_CLASS_PATH TABLE

| HRB_ID | Sequence | BI_Asset_class |
|---|---|---|
| 1 | 1 | VC |
| 2 | 1 | Hosts |
| 3 | 1 | Server |
| 4 | 1 | Dir |
| 5 | 1 | DC |
| 6 | 1 | VC |
| 6 | 2 | Hosts |
| 7 | 1 | VC |
| 7 | 2 | Hosts |
| 7 | 3 | Server |
| 8 | 1 | VC |
| 8 | 2 | Hosts |
| 8 | 3 | Server |
| 8 | 4 | Dir |
| 9 | 1 | VC |
| 9 | 2 | DC |
| 10 | 1 | VC |
| 10 | 2 | DC |
| 10 | 3 | Server |
| 11 | 1 | VC |

HRB_CLASS_PATH TABLE (continued)

| HRB_ID | Sequence | BI_Asset_class |
|---|---|---|
| 11 | 2 | DC |
| 11 | 3 | Server |
| 11 | 4 | Dir |
| 12 | 1 | Hosts |
| 12 | 2 | Server |
| 13 | 1 | Hosts |
| 13 | 2 | Server |
| 13 | 3 | Dir |
| 14 | 1 | DC |
| 14 | 2 | Server |
| 15 | 1 | DC |
| 15 | 2 | Server |
| 15 | 3 | Dir |
| 16 | 1 | Server |
| 16 | 2 | Dir |
| 17 | 1 | Dir |
| 17 | 2 | Dir |

FIGURE 4

DIRECTED GRAPH TRANSITIVE CLOSURE

BACKGROUND

This disclosure pertains to a method and system for maintaining a graph transitive closure and path structure in a database using database triggers. More particularly, but not by way of limitation, this disclosure relates to firing database triggers when vertices and arcs are added to or deleted from a directed graph modeling a hierarchy to perform a delta operation on the table or tables used to maintain the graph transitive closure and path structure to reduce or possibly eliminate the need to recalculate this information at request time.

Database systems are prevalent in today's computer environment. Many of today's databases have a capability commonly referred to as "triggers." A database trigger is procedural code that is automatically executed in response to certain events on a particular table or view in a database. The trigger is often used for keeping the integrity of the information in the database. In a simple example, when a new record representing a new worker is added to an employee table, new records should also be added in tables of taxes, vacations and salaries. Database triggers are generally well known in the art and therefore are not explained further here.

A binary relation <R> on a set X is a collection of ordered pairs of elements of X. In other words, it is a subset of the Cartesian product $X^2=X \times X$. More generally, a binary relation between two sets A and B is a subset of A×B. The terms dyadic relation and 2-place relation are synonyms for binary relations.

An example is the "divides" relation between the set of prime numbers P and the set of integers Z, in which every prime p is associated with every integer z that is a multiple of p (and not with any integer that is not a multiple of p). In this relation, for instance, the prime 2 is associated with numbers that include −4, 0, 6, 10, but not 1 or 9; and the prime 3 is associated with numbers that include 0, 6, and 9, but not 4 or 13.

Binary relations are used in many branches of mathematics to model concepts like "is greater than", "is equal to", and "divides" in arithmetic, "is congruent to" in geometry, "is adjacent to", "is an ancestor of", and "is a child of" in graph theory, "is orthogonal to" in linear algebra and many more. The concept of function is defined as a special kind of binary relation. Binary relations are also heavily used in computer science.

A particular kind of binary relation is a transitive relation. A binary relation R over a set X is transitive if whenever an element a is related to an element b, and b is in turn related to an element c, then a is also related to c.

The transitive closure <R+> of a binary relation <R> on a set X is the smallest transitive relation on X that contains <R>. If the original relation is transitive, the transitive closure will be that same relation; otherwise, the transitive closure will be a different relation. For example: if X is a set of classes and x<R>y means "x is the parent class of y", then the transitive closure of <R> on X is the relation <R+> where u<R+>v means: "there is path from u to v". Simply put, the transitive closure of a digraph is the "reachability" relation of the digraph and a strict partial order.

A Directed Graph or digraph is an ordered pair of two sets. The first set is the set of vertices. The second set is the set of directed edges called arcs. The vertex set is just a collection of the labels for the vertices, a way to tell one vertex from another. The edge set is made up of ordered pairs of vertex labels from the vertex set. A "path" in a digraph is a sequence of vertices from one vertex to another using the arcs. The length of a path is the number of arcs used, or the number of vertices used minus one. A "simple path" cannot visit the same vertex twice. A closed path has the same first and last vertex in the digraph. In a digraph, a "cycle" is a simple closed path.

In a digraph if there is a path from vertex x to vertex y—then x is an ancestor of y. In that respect the Ancestor Descendant Relationship is the transitive closure of the graph's arcs—representing the parent child relationship. Ancestor Descendent Relationships are particularly important in areas of Business Service Management (BSM) and Enterprise Systems Management (ESM) along with many other fields. In BSM and ESM the ancestor descendent relationship is typically used to determine which components of an Information Technology (IT) infrastructure could "impact" (i.e., affect through failure or degradation) other systems or business services that depend upon the component that is not performing to specification. The impact relationship is often maintained in what is called a "service model" and a service model is often represented by a digraph.

Prior art techniques for calculating a directed graph transitive closure exist in many different mathematical formulas and some database vendors provide hierarchical query mechanisms. However, these query mechanisms and formulas require graph traversal upon invocation and accordingly have high time complexities. Therefore, systems and methods are proposed to reduce the time complexities and solve other issues. In one disclosed embodiment, the time required to access the hierarchical data of a service model and dynamically keep the transitive closure data in synch with objects (e.g., IT components, IT services, business services, etc.) modeled via the digraph is reduced.

BRIEF DESCRIPTION OF THE DRAWINGS

FIGS. 2A-B illustrates an example of a schema for two databases tables for persisting class graph transitive closure and path structure according to one possible embodiment.

FIG. 3 illustrates, in table form, information that could be persisted about ancestor dependent relationships in one database table relative to digraph 100 according to one example embodiment.

FIG. 4 illustrates, in table form, information that could be persisted about path structure in conjunction with the information of FIG. 3 relative to digraph 100 according to one example embodiment.

DETAILED DESCRIPTION

Figure 1:
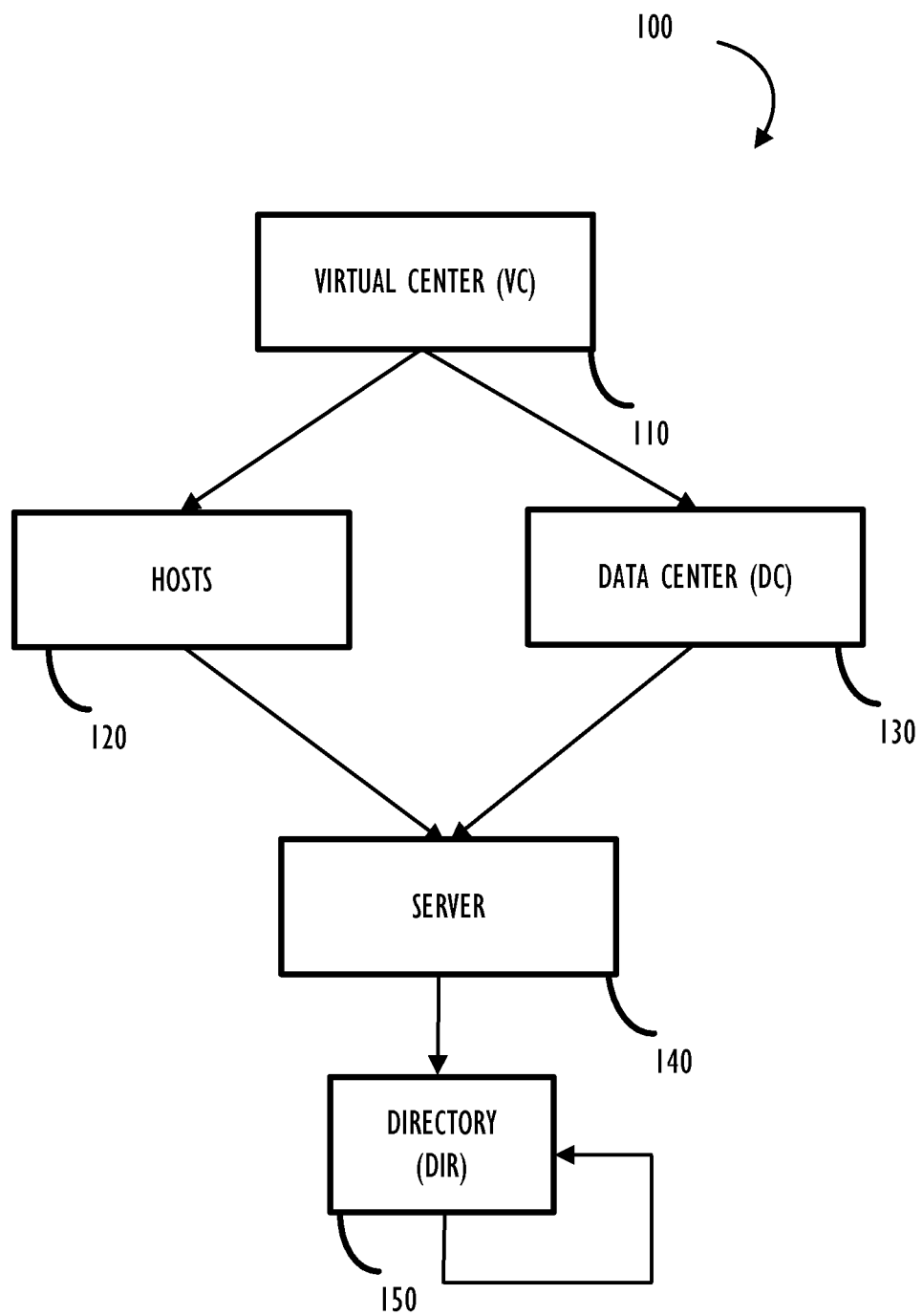
FIG. 1 illustrates, in block diagram form, an example of a directed graph (digraph 100) of IT objects in a hierarchy.

The present disclosure is described in the context of a service impact model for providing service management functions for a corporate environment. However, the concepts disclosed herein for maintaining a transitive closure and path structure for an ancestor/descendent relationship could be applied to any object hierarchy in which the child parent relationship (over a plurality of generations) is needed. Additionally, the concepts of this disclosure do not only apply to hierarchical structures (i.e., pure hierarchies such as tree structures without cycles), but to any arbitrary directed graph where cycles exist. The transitive closure of a tree hierarchy is a special "simpler" case of a directed graph. Therefore, any technical or mathematical model that requires knowledge of this type of relationship may benefit from the concepts of this disclosure (e.g., class relationship, class inheritance, hierarchical company organizations, reporting hierarchy, directory hierarchy, etc.). In a practical application, a transitive closure and path structure of a digraph (representing an IT model) could be used to determine all the IT components, either real (e.g., physical hard disk) or virtual (e.g., virtual center containing virtual machines), that have a dependency/impact relationship on each other. For example, to answer a question like: "what are all computer applications, business functions, and hardware components that could be impacted if a particular physical disk failed?"

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in any field requiring maintenance of a transitive closure and path structure having the benefit of this disclosure (e.g., the information technology support system field).

Referring now to FIG. 1, a block diagram of digraph 100 illustrates an uncomplicated digraph 100 of ancestor descendent relationships for IT elements. For simplicity, no arcs of distance ZERO are shown in the diagram. Obviously, an arc of distance ZERO represents an arc from a node pointing to itself except in the case where an instance of the object can contain another instance of the class of object, as shown for element 150, where it is clear that an instance of a directory object (e.g., in a file system) can contain another instance of a directory object. Arcs of ZERO length are described in this disclosed embodiment for completeness and to aid in (i.e., simplify) the implementation of database triggers. As can be seen in digraph 100, Virtual Center (VC) 110 is a parent of both hosts 120 and data center (DC) 130. Server 140 has two parents (hosts 120 and DC 130). Finally, directory 150 is a child of Server 140 and has no children. Clearly, VC 110 has 4 descendents, namely hosts 120, DC 130, Server 140 and directory 150. Please note that there are two separate paths from VC 110 to server 140 (and thus two distinct paths from VC 110 to directory 150). Therefore, VC 140 requires seven outgoing paths (a first to itself, a second to hosts 120, a third to DC 130, a fourth and fifth to server 140, and a sixth and a seventh to directory 150).

Referring now to FIGS. 2A-B which illustrate an example schema of two database tables suitable for one embodiment of this disclosure. Consider a generic example of a class hierarchy. A hierarchical class structure could be persisted in two objects. For example, a "CLASS" object for persisting the main information about the class and a "CLASS_RELATION" object for persisting <parent, child> relationship of the classes. The "CLASS_RELATION" is the table that ultimately defines the hierarchical structure of the CLASS. The relationship represented in this object allows, in its generic form, for multiple parents and cycles. Additionally, a structure capable of persisting the class graph transitive closure is shown in FIG. 2A element 200. A structure capable of persisting the path structure is shown in FIG. 2B element 250. Each of these table structures has a key table element named HRB_ID. Additional elements of each of these tables will be apparent from the discussion below.

Referring now to FIGS. 3 and 4 each of which illustrate, in table form, possible values describing the class graph transitive closure (table 300) and path structure (table 400), respectively for the digraph 100 of FIG. 1. As can be seen in the class transitive closure structure (HRB_CLASS) of table 300, there are seventeen types of class objects that should be maintained in a persistent storage. Each of these has a unique HRB_ID as a key element to allow for a delta algorithm (as explained further below) to be applied to keep a persistent record of relationships without necessarily requiring recalculation of all ancestor/descendent relationships. The HRB_CLASS object can persist the <ancestor, descendant> relationships indicating the end points of the different simple paths and cycles leading from ancestor node to descendant node. The hrb_class could contain the <ancestor, descendant> multiple times if there are different simple paths leading from ancestor to descendant. Next, the path structure (HRB_CLASS_PATH) table 400, illustrates all possible paths of digraph 100. Note that elements 410 for HRB_ID 17 indicate that there are two instances of a directory object (with one directory object containing the other) represented in digraph 100 (See element 150 of FIG. 1). The hrb_class_path object contains the sequence of vertexes visited to form the path from ancestor to descendant. In that respect this embodiment represents a deviation from the "pure" graph closure persistence. The reason for deviating is to maintain the path structure of the graph not only the reach-ability of vertexes. In one embodiment, the basic approach for populating the above 2 objects is to use DB triggers on addition and deletion of vertexes and edges. The update of edges could be implemented as a sequence of deletion and addition. In that respect, this embodiment illustrates the graph transitive closure and path structure could be dynamically built as the corresponding changes occur. In total, HRB_CLASS table 300 and HRB_CLASS_PATH table 400 contain information representing a complete transitive graph closure and path structure for the example of digraph 100. This complete set of information will be referred to herein as "hierarchy bridge tables." Even though only two tables are shown in this example (Le., 300 and 400), any number of actual table structures within a database could be used based on design considerations.

Figure 5:
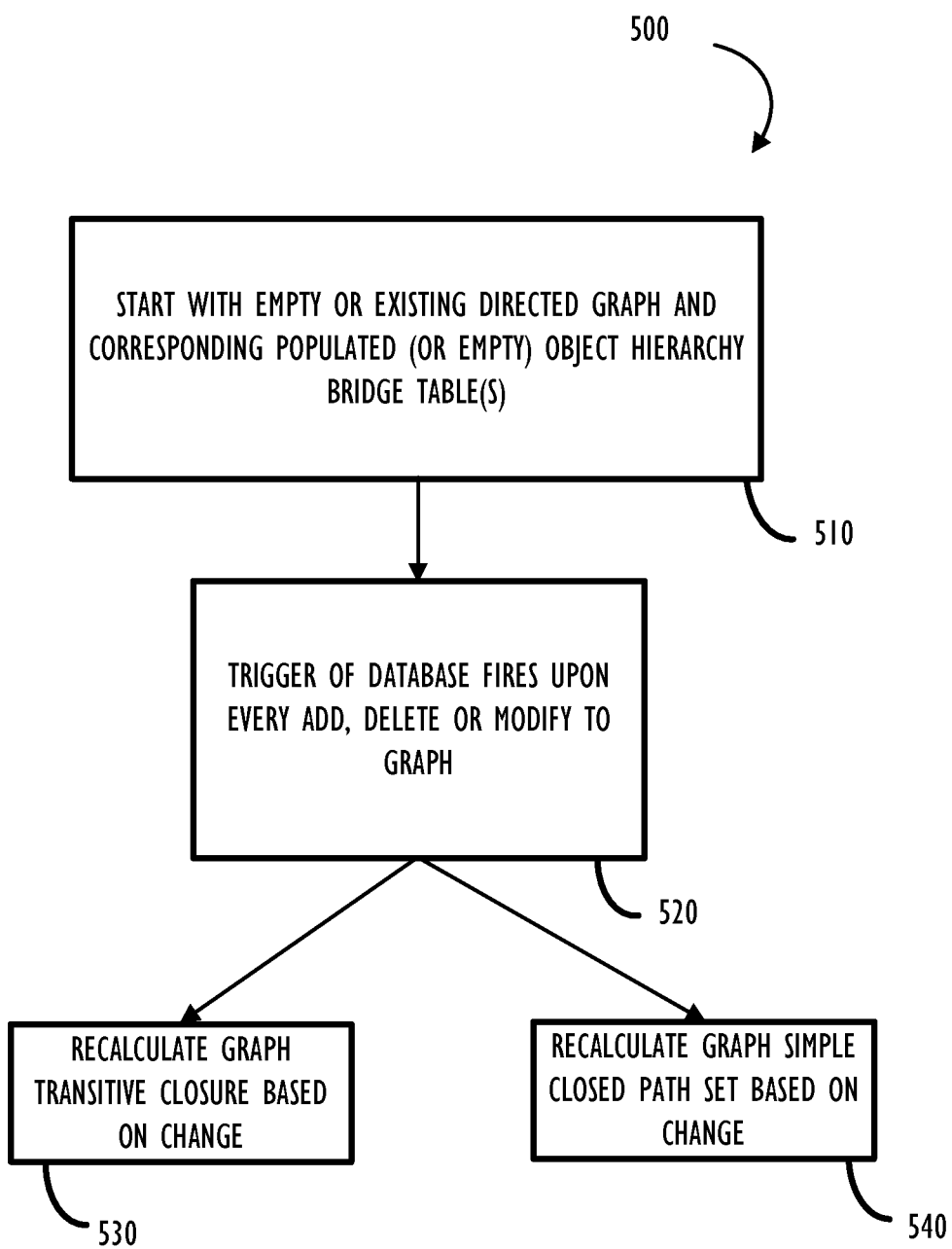
FIG. 5 illustrates, in flowchart form, a process for populating and maintaining database information relative to transitive closure and path structure according to one disclosed embodiment.

Referring now to FIG. 5, flow chart 500 illustrates a high level process for both initializing and maintaining the hierarchy bridge tables. A first time at block 510, an empty set of hierarch bridge tables exists and an initial node is added to a digraph (such as VC 110 of FIG. 1). When this initial node is added (block 520) two database triggers are initiated. One trigger, indicated by block 530, is initiated to recalculate the transitive closure information (HRB_CLASS of FIG. 3 in the above example). A second trigger, indicated by block 540, is also initiated to recalculate the closed path set (HRB-_CLASS_PATH of FIG. 3 in the above example). The recalculation performed in this initial instance is merely to populate the initial information in each of these tables for a single node. When a second node is added (block 510) each trigger fires a second time (block 520) and information representing a two node digraph is added to the hierarchy bridge tables (e.g., 300 and 400). It is important to note that each of the triggers represented by blocks 530 and 540 only apply a delta recalculation method to the hierarchy bridge tables.

In one embodiment, a first set of triggers (on addition and deletion of class objects) could have the following functions:
  to add entries in the hrb_class and hrb_class_path for the vertexes (ancestor and descendant are the same; distance is 0—added for simplicity of the trigger implementation) when classes are added to the hierarchy
  to delete entries from hrb_class and hrb_class_path when corresponding bl_asset_classes are deleted from the hierarchy
  TRG_I_CLASS—trigger after insert on CLASS. The action of the trigger is to insert records in hrb_class and hrb_class_path: ancestor and descendant are the same, distance=0, single path entry denoting the vertex as a single entry in the path of length 0.
  TRG_D_CLASS—trigger after delete on CLASS. The action of the trigger is to delete from hrb_class and their counterparts from the hrb_class_path for all those entries for which the path entries contain the deleted class as a visited vertex.

Additionally, a second set of triggers could handle (insert and delete on CLASS_RELATION). The insert trigger on the class_relation should build the new addition to the graph transitive closure and add all the paths introduced via the addition of the new graph edge (arc). The delete trigger on class_relation should delete all the hrb_class_path entries containing the deleted edge (arc) and the corresponding ancestor, descendant entries in the hrb_class table. For example, if a new edge (arc) is being added to the example class hierarchy (i.e., class_relation(x0,y0)). In this embodiment, the proposed algorithm assumes that all new paths include the arc(x0,y0). Another assumption of this embodiment is that we have already built the closure and path structure before the addition of the arc(x0,y0).

New path additions could comprise:
  A) Insert into hrb_class_path: for all paths starting with x and ending with x0—hrb_class_path(x, x0) and all the paths starting with y0 and ending with y—hrb_class_path(y0,y) build a path hrb_class_path(x,y) excluding all those paths that have a vertex visited more than once but adding the cycle hrb_class_path(x,y) where x=y if a cycle is formed.
New class hierarchy additions could comprise:
  B) Insert into hrb_class: for all paths added in A)—add the corresponding hrb_class(x,y)—ancestor, descendant entries.
A Delete trigger could comprise:
  TRG_D_CLASS_RELATION—Delete trigger. The trigger action could be described as follows: if deleting an edge (arc) (x0,y0) then:
  C) delete all paths that have the arc(x0,y0);
  D) delete all the hrb_class(x,y) ancestor descendant relationships for which the corresponding paths in C) were deleted.

In this embodiment of building the hierarchy using the hierarchy bridge table, on every step upon trigger firing and building the newly formed transitive closure relationships the time complexity is:

T=O(n**4) where n is the number of nodes in the graph; and the time complexity for retrieving the transitive closure using the hierarchy bridge table is:

T=O(n**2) where n is the number of the nodes in the graph.

These time complexities can be compared with T=O(n!) which represents a typical database vender recursive access of the prior art.

As will be apparent to those of ordinary skill in the art the embodiments of this disclosure make it possible to create and keep in synch one or more hierarchy bridge tables (transitive closure and path structure) with the object hierarchy. This allows for a unified "recursion-free" data access to the object hierarchy and in this way improves substantially the performance of the hierarchy DB access. At least one other aspect of this disclosure is that certain embodiments use DB triggers to keep the hierarchy bridge table in synch with the object relationship table (representing the parent-to-child relationship) and do not require any additional application coding for maintaining the synchronization.

Figure 6:
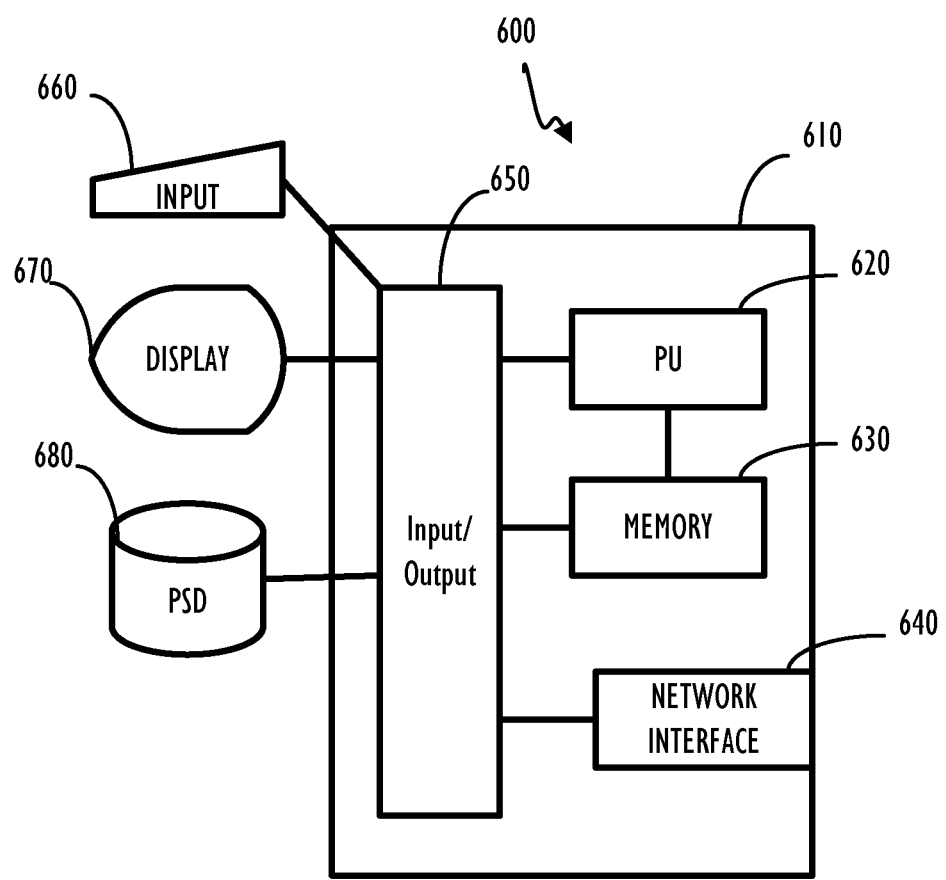
FIG. 6 illustrates, in block diagram form, an example computing device comprising a program control device.

Referring now to FIG. 6, example computing device 600 is shown. One or more example computing devices 600 may be included in a mainframe or distributed computer (neither shown). Example computing device 600 comprises a programmable control device 610 which may be optionally connected to input devices 660 (e.g., keyboard, mouse, touch screen, etc.), display 670 and/or program storage device (PSD) 680 (sometimes referred to as a direct access storage device DASD). Also, included with program control device 610 is network interface 640 for communication via a network with other computing and corporate infrastructure devices (not shown). Note network interface 640 may be included within programmable control device 610 or be external to programmable control device 610. In either case, programmable control device 610 will be communicatively coupled to network interface 640. Also note, program storage unit 680 represents any form of non-volatile storage including, but not limited to, all forms of optical and magnetic storage elements including solid-state storage.

Program control device 610 may be included in a computing device and be programmed to perform methods in accordance with this disclosure. Program control device 610 may itself comprise processor unit (PU) 620, input-output (I/O) interface 650 and memory 630. Processing unit 620 may include any programmable control device including, for example, processors of an IBM mainframe (such as a quad-core z10 mainframe microprocessor). Alternatively, in non-mainframe systems examples of processing unit 620 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 5 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method to maintain an object transitive closure for a hierarchical relationship of objects in a directed graph model, the method comprising:
    listing vertices of the directed graph model in an object transitive closure data table;
    listing a sequence of vertices in the directed graph visited to form a path from ancestor to descendant in a path structure data table;
    forming a hierarchy bridge table of the directed graph model of the hierarchical relationship of objects using both the object transitive closure data table and the path structure table, the directed graph model stored in a computer system, the directed graph model representing a parent child relationship between a plurality of information technology (IT) components, the plurality of IT components comprising computing resources;
    receiving a change indication, the change indication identifying a change to the directed graph model of the hierarchical relationship of objects; and
    initiating a procedural algorithm to apply a delta change to a stored representation of the object transitive closure data table and also the path structure table in the hierarchy bridge table of the directed graph model, the delta change reflecting: adding an IT component or deleting an IT component.

2. The method of claim 1, wherein the digraph model is stored in a database.

3. The method of claim 2, wherein the procedural algorithm is initiated via a trigger function of the database.

4. The method of claim 3, wherein the trigger function of the database is fired because of the change indication.

5. The method of claim 1, wherein the parent child relationship reflects a dependency/impact relationship.

6. The method of claim 1, wherein the plurality of IT components comprise physical and virtual IT components.

7. The method of claim 1, wherein an initial digraph model stored in the computer system is empty and the change indication indicates a first node representing an IT component has been added to the digraph model.

8. The method of claim 1, wherein the delta change is applied to tables comprising hierarchy bridge tables.

9. The method of claim 1, further comprising: recalculating the object transitive closure and path structure by only adding or deleting information to the stored representation of the object transitive closure and path structure for nodes directly adjacent to a modified node.

10. The method of claim 1, wherein the change indication comprises an indication resulting from adding a node representing an IT component to the digraph model.

11. The method of claim 1, wherein the change indication comprises an indication resulting from deleting a node representing an IT component to the digraph model.

12. The method of claim 10, wherein the change indication comprises an indication resulting from adding a node between two already existing nodes.

13. The method of claim 11, wherein the change indication comprises an indication resulting from deleting a node from between two already existing nodes.

14. The method of claim 1, wherein the change indication comprises an indication resulting from adding a relationship between two nodes, each of the two nodes representing an IT component, in the digraph model.

15. A method to maintain an object transitive closure and path structure for a hierarchical relationship of objects in a directed graph, the method comprising:
    representing the object transitive closure and the path structure for the hierarchical relationship of objects in the directed graph in an object transitive closure table and a path structure table, respectively, in a data base on one or more computer systems, the object transitive closure table and the path structure table together forming hierarchical bridge tables;
    receiving a change indication, the change indication indicating a change to the directed graph of the hierarchical relationship of objects, the directed graph representing a plurality of information technology (IT) components and relationships between at least a portion of the plurality of IT components; and
    firing a trigger for a procedural algorithm to apply a delta change to one or more hierarchical bridge tables,
    wherein the procedural algorithm includes:
        initiating two database triggers—a first database trigger to recalculate the object transitive closure information and a second database trigger to recalculate a closed path set, when a first time an empty set of hierarchy bridge tables exists and an initial object is added to the directed graph; and firing each database trigger a second time and adding information representing a two node digraph to the hierarchy bridge tables, when a second object is added to the directed graph.

16. The method of claim 15, wherein the trigger is fired because of the change indication.

17. The method of claim 15, wherein an initial representation of the graph stored in the database is empty and the change indication comprises an indication resulting from adding a first node, the first node representing an IT component.

18. The method of claim 15, further comprising: recalculating the object transitive closure and path structure by only adding or deleting information to the stored representation of the object transitive closure and the path structure for nodes directly adjacent to a modified node.

19. The method of claim 15, wherein the change indication comprises an indication resulting from adding a node.

20. The method of claim 15, wherein the change indication comprises an indication resulting from deleting a node.

21. The method of claim 15, wherein the change indication comprises an indication resulting from adding a node between two nodes.

22. The method of claim 15, wherein the change indication comprises an indication resulting from deleting a node from between two already existing nodes.

23. The method of claim 15, wherein initiating the first database trigger includes:

adding entries in the object transitive closure and the path structure tables for vertices of an initial node with path distance 0; and deleting entries from the object transitive closure and the path structure tables when corresponding nodes are deleted from the hierarchy, the deleted entries corresponding to path entries which contain the deleted object as a visited vertex.

24. The method of claim 15, wherein initiating the second database trigger includes:

inserting on a class relation building a new addition to the object transitive closure table and adding all the paths introduced via the addition of a new graph edge to the path structure table; and deleting path entries in the path structure table containing a deleted edge and deleting corresponding ancestor-descendant entries in the object transitive closure table.

25. A non-transitory computer readable medium comprising computer readable instructions stored thereon to cause a processing device to:

list vertices of a directed graph model in an object transitive closure data table list a sequence of vertexes in the directed graph visited to form a path from ancestor to descendant in a path structure data table, form a hierarchy bridge table of the directed graph model using both the object transitive closure data table and the path structure table, the directed graph model stored in a computer system, the directed graph model representing a parent child relationship between a plurality of information technology (IT) components, the plurality of IT components comprising computing resources;

receive a change indication, the change indication identifying a change to the directed model of hierarchical relationship of objects; and initiate a procedural algorithm to apply a delta change to a stored representation of the object transitive closure data table and also the path structure table in the hierarchy bridge table of the directed graph model, the delta change reflecting:

adding an IT component and deleting an IT component.

* * * * *

UNITED STATES PATENT AND TRADEMARK OFFICE
CERTIFICATE OF CORRECTION

PATENT NO. : 8,667,027 B2 Page 1 of 1
APPLICATION NO. : 13/074983
DATED : March 4, 2014
INVENTOR(S) : Zack Milousheff It is certified that error appears in the above-identified patent and that said Letters Patent is hereby corrected as shown below:

In the Claims

In column 10, line 6, in claim 24, delete "class relation" and insert -- class_relation --, therefor.

Signed and Sealed this
Third Day of June, 2014

Michelle K. Lee
*Deputy Director of the United States Patent and Trademark Office*